(12) United States Patent
Rohrke

(10) Patent No.: US 7,874,093 B2
(45) Date of Patent: Jan. 25, 2011

(54) WIND DRIVEN BIRD ATTRACTOR

(75) Inventor: Donald H. Rohrke, San Diego, CA (US)

(73) Assignee: R.H. Manufacturing, Inc., San Diego, CA (US)

( * ) Notice: Subject to any disclaimer, the term of this patent is extended or adjusted under 35 U.S.C. 154(b) by 198 days.

(21) Appl. No.: 12/043,864

(22) Filed: Mar. 6, 2008

(65) Prior Publication Data

US 2008/0216382 A1   Sep. 11, 2008

Related U.S. Application Data

(60) Provisional application No. 60/893,532, filed on Mar. 7, 2007.

(51) Int. Cl.
    *A01M 31/06*    (2006.01)
(52) U.S. Cl. ............................................. 43/2
(58) Field of Classification Search .............. 43/2, 43/3; 116/22 A; 446/176, 201, 217, 218, 446/246; 359/520, 522, 525; 40/412, 422, 40/439–441
    See application file for complete search history.

(56) References Cited

U.S. PATENT DOCUMENTS

| | | | | |
|---|---|---|---|---|
| 1,356,023 | A | * | 10/1920 | St. Cyr .................... 446/218 |
| 2,810,223 | A | * | 10/1957 | Fraesdorf, Jr. ............... 40/479 |
| 3,704,538 | A | | 12/1972 | Gagnon |
| 3,798,820 | A | | 3/1974 | Dye |
| 3,939,591 | A | | 2/1976 | Schwartztrauber |
| 4,120,110 | A | | 10/1978 | Aeschliman |
| 4,128,958 | A | | 12/1978 | Snow |
| 4,131,079 | A | * | 12/1978 | Rousseau et al. .......... 116/22 A |
| 4,535,560 | A | | 8/1985 | O'Neil |
| 4,611,421 | A | | 9/1986 | Jacob |
| 4,612,722 | A | | 9/1986 | Ferrell |
| 4,651,457 | A | | 3/1987 | Nelson et al. |
| 4,674,219 | A | | 6/1987 | Chargo et al. |
| 4,753,028 | A | | 6/1988 | Farmer |
| 4,845,873 | A | | 7/1989 | Hazlett |
| 4,850,798 | A | * | 7/1989 | Bailey .......................... 416/11 |
| 4,896,448 | A | | 1/1990 | Jackson |
| 5,144,764 | A | | 9/1992 | Peterson |
| 5,172,506 | A | | 12/1992 | Tiley et al. |
| 5,367,813 | A | | 11/1994 | Cherry |
| 5,392,554 | A | | 2/1995 | Farstad et al. |
| 5,515,637 | A | | 5/1996 | Johnson |
| D373,601 | S | * | 9/1996 | Jackle ........................ D20/21 |
| 5,551,923 | A | | 9/1996 | Worzella |
| 5,555,664 | A | | 9/1996 | Shockley |
| 5,566,491 | A | | 10/1996 | Phillips |
| 5,809,683 | A | | 9/1998 | Solomon |
| 5,893,230 | A | | 4/1999 | Koltoniak |
| 5,930,936 | A | | 8/1999 | Parr et al. |

(Continued)

*Primary Examiner*—Joshua J Michener
(74) *Attorney, Agent, or Firm*—Mintz, Levin, Cohn, Ferris, Glovsky and Popeo, P.C.

(57) ABSTRACT

Methods and apparatus are provided for attracting animals. In one aspect, there is provided a wind driven device, such as a decoy for animals, such as waterfowl, birds, humans, and the like. The device may include a support pole; a hanging rod coupled to the support pole; and a blade coupled to a swivel mechanism. The swivel mechanism is further coupled to the hanging rod. The blade is attached to the swivel mechanism and shaped to move to attract one or more animals when the blade moves in response to wind. Related apparatus and methods are also described.

10 Claims, 10 Drawing Sheets

U.S. PATENT DOCUMENTS

| | | | |
|---|---|---|---|
| 6,082,036 A | 7/2000 | Cripe | |
| 6,088,944 A | 7/2000 | Jones | |
| 6,092,322 A | 7/2000 | Samaras | |
| 6,170,188 B1 | 1/2001 | Mathews | |
| 6,216,382 B1 | 4/2001 | Lindaman | |
| 6,243,982 B1 | 6/2001 | Halterman, Jr. | |
| 6,321,480 B1 | 11/2001 | Solomon | |
| 6,360,474 B1 | 3/2002 | Wurlitzer | |
| 6,374,530 B1 | 4/2002 | Mierau | |
| 6,385,895 B1 | 5/2002 | Scaries | |
| 6,412,209 B1 | 7/2002 | Kapraly et al. | |
| 6,412,210 B1 | 7/2002 | Horrell | |
| 6,430,863 B1 | 8/2002 | Krag | |
| 6,442,885 B1 | 9/2002 | Payne | |
| 6,493,980 B1 | 12/2002 | Richardson et al. | |
| 6,543,176 B1 | 4/2003 | McGhghy | |
| 6,574,903 B2 | 6/2003 | Solomon | |
| 6,625,919 B1 | 9/2003 | Davis et al. | |
| 6,643,971 B2 | 11/2003 | Daniels | |
| 6,655,071 B2 | 12/2003 | Barnes et al. | |
| 6,658,782 B2 | 12/2003 | Brint | |
| 6,675,522 B2 | 1/2004 | Mathews | |
| 6,715,228 B1 | 4/2004 | Price | |
| 6,745,510 B1 | 6/2004 | Coker | |
| 6,833,502 B1 * | 12/2004 | Boatner | 84/402 |
| 6,907,688 B2 | 6/2005 | Brint | |
| 7,028,429 B1 | 4/2006 | Druliner | |
| 7,131,230 B1 | 11/2006 | Gilsdorf | |
| 7,137,221 B2 | 11/2006 | Highby et al. | |
| 2005/0178036 A1 * | 8/2005 | Henick et al. | 40/617 |
| 2007/0137092 A1 * | 6/2007 | Butz | 43/3 |

* cited by examiner

135

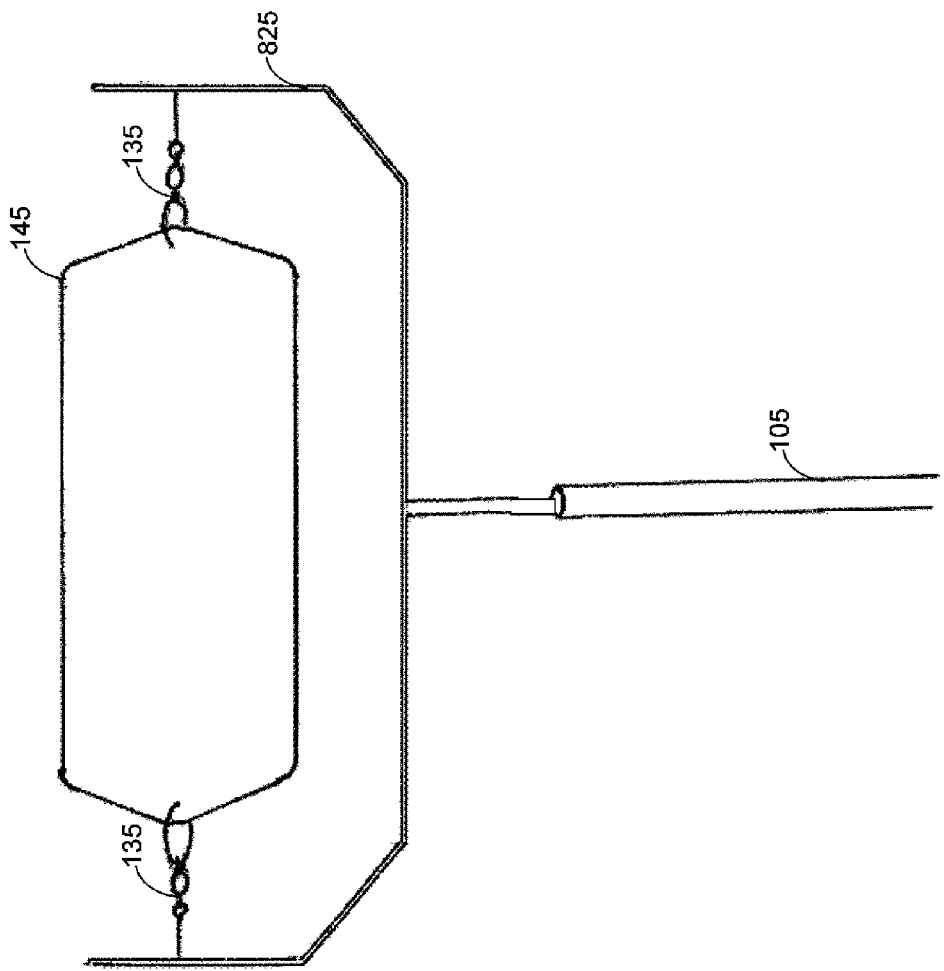

WIND DRIVEN BIRD ATTRACTOR

CROSS REFERENCE TO RELATED APPLICATION

This application claims the benefit under 35 U.S.C. Section 119(e) of a provisional application U.S. Ser. No. 60/893,532, entitled "WIND DRIVEN GAME BIRD ATTRACTOR," filed Mar. 7, 2007, which is incorporated by reference herein.

FIELD

The present disclosure generally relates to a decoy for attracting animals, such as birds.

BACKGROUND

Decoys have been used for many years in various applications to attract animals, such as waterfowl and other birds, to desired areas. Typically, a person will arrange one or more decoys in a field or in a body of water, such as a lake or a pond, to attract the animals to the area. The decoy is intended to mimic the presentation of a group of animals. For example, in the case of waterfowl, arranging a plurality of decoys mimics a group of waterfowl, which apparently attracts real waterfowl.

In the case of waterfowl, the decoys have the appearance of waterfowl. Moreover, the decoys typically include a motorized mechanism, such as motorized wings, to resemble the waterfowl's movement, such as wings flapping. Regardless of the mechanism used or its appearance, the objective of a decoy is to attract an animal, such as waterfowl, to enable a user, such as a hunter, a photographer, a bird watcher, and the like, to shoot, photograph, or view the waterfowl.

SUMMARY

The subject matter disclosed herein provides apparatus and methods for attracting animals, such as waterfowl, humans, and the like.

In one aspect, there is provided a device. The device may include a support pole and a hanging rod coupled to the support pole. The device further includes a blade coupled to a swivel mechanism, which is further coupled to the hanging rod. The blade is shaped to move to attract one or more animals when the blade moves in response to wind.

In another aspect, there is provided a decoy. The decoy may include a support pole and a hanging rod for coupling to the support pole. The decoy may also include a blade coupled to a swivel mechanism coupled to the hanging rod. The blade is shaped to move by spinning to attract a bird when the blade moves in response to wind, without the blade resembling the bird and without the movement of the blade being powered by electricity.

In another aspect, there is provided a device including a hanging rod coupled to a support pole. The device further includes a blade coupled to a swivel mechanism for coupling to the hanging rod. The swivel mechanism allows the blade to move by spinning freely. The blade is attached to the swivel mechanism and shaped to move by spinning in response to wind. The blade may further include an indication on at least one surface of the blade, such that when the blade spins the indication on the at least one surface is visible.

In another aspect, there is provided a method for advertising. The method may include selecting an indication to advertise at least one of a good or a service, and using a blade that is shaped to move by spinning. The blade including the indication on at least one surface of the blade, such that when the blade spins the indication on the at least one surface is visible.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

In the drawings,

FIGS. 8A-8B depict alternative configurations for the wind driven device.

Figure 1:
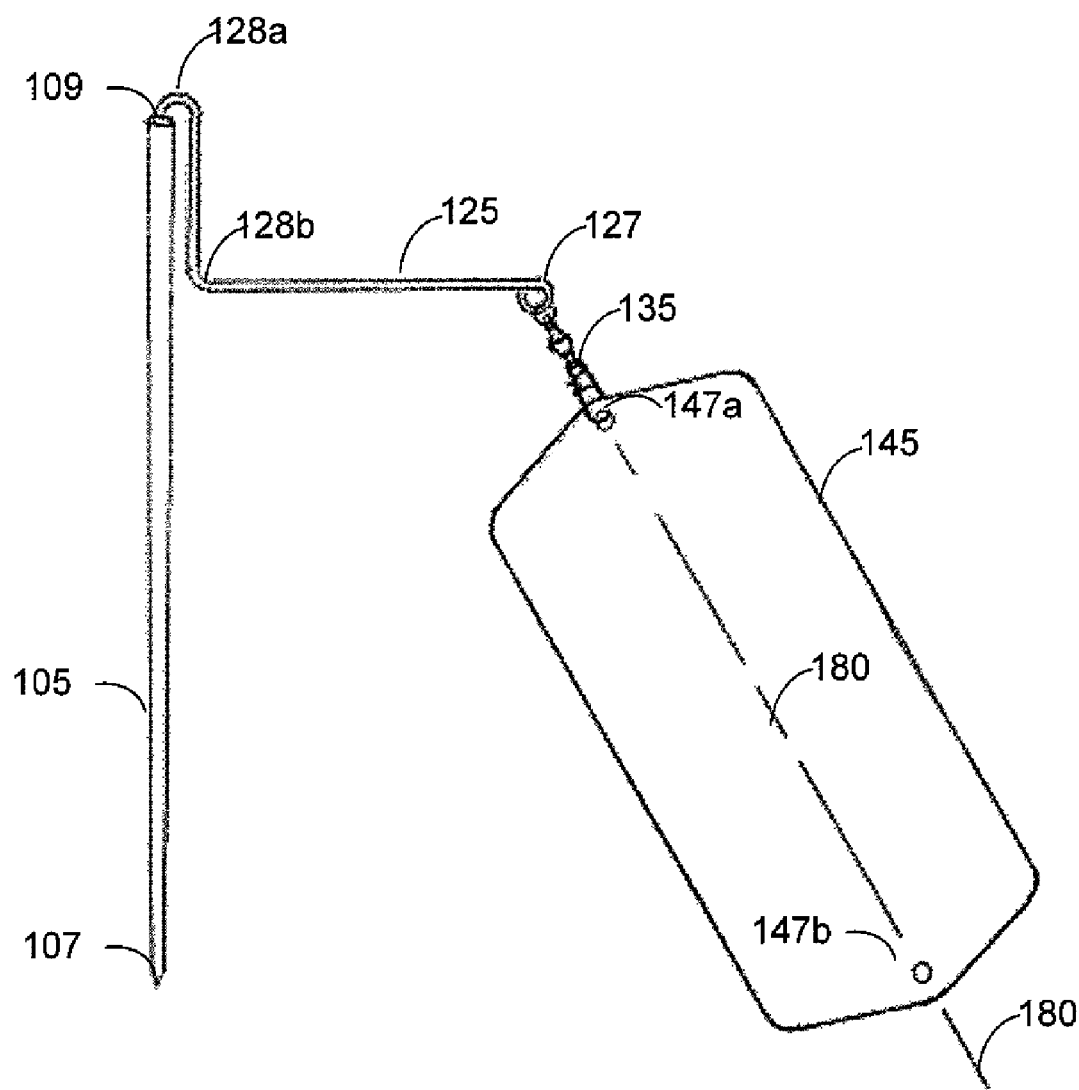
FIG. 1 depicts a diagram of an example of a wind driven device for attracting birds.

Like labels are used to refer to same or similar items in the drawings.

DETAILED DESCRIPTION

FIG. 1 is a diagram of a wind driven device 100 for attracting animals. The wind driven device 100 may be used as a decoy to lure or lead animals, such as birds, waterfowl, and the like. In some implementations, the decoy lures the animal within the range of a hunter, a photographer, or the like, while in other implementations the animals are just attracted to the wind driven device 100. The wind driven device 100 may also be used to attract other animals, such as humans. The wind driven wind device 100 may include a support pole 105, a hanging rod 125, a swivel mechanism 135, and a blade 145.

The support pole 105 may have a first end 107 for insertion into the ground or insertion into a fixture, such as a stand. For example, first end 107 may have a shaped point to allow the support pole to be inserted into the ground. The second end 109 of support pole 105 may be adapted to allow hanging rod 125 to be inserted into second end 109. Alternatively, a sleeve may be used, such that one end of the sleeve receives second end 109 and the other end of the sleeve receives hanging rod 125. In some implementations, second end 109 allows hanging rod 125 to rotate (i.e., swivel freely). In other implementations, second end 109 receives an end of hanging rod 125 in a fixed manner, so that hanging rod 125 cannot rotate. The support pole 105 may have any height or any diameter; however, in some implementations, support pole 105 has a height of 45 inches and a diameter of ½ inch to provide enhanced animal attraction.

Hanging rod 125 is coupled to support pole 105. For example, a first end of hanging rod 125 may be coupled to support pole 105 by inserting hanging rod 125 into support pole 105, although other mechanisms may be used to couple support pole 105 and hanging rod 125. The hanging rod may include a second end 127. The second end 127 may include a mechanism for coupling hanging rod 125 to a swivel mechanism 135. For example, the second end 127 may include an eyelet for coupling swivel mechanism 135. Although FIG. 1 depicts hanging rod 125 as having a so-called "L-shape" configuration, hanging rod 125 may be shaped in any manner to allow blade 145 to move freely without being impeded by support pole 105. For example, bends 128*a-b* may be varied to any angle to allow blade 145 to move freely without being impeded by support pole 105. For example, bend 128*a* may be varied to a 90 degree bend and bend 128*b* may be omitted (i.e., a 0 degree bend).

Although FIG. 1 depicts the so-called "L-shape" configuration of the hanging rod 125, the hanging rod may be shaped in a so-called "Y-shape" configuration as described L below with respect to FIG. 8A.

Figure 2:
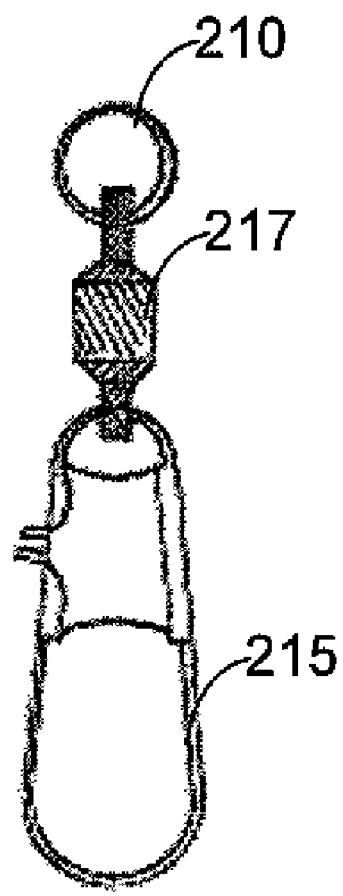
FIG. 2 depicts a swivel mechanism for coupling the blade to a hanging rod.

FIG. 2 depicts an example of swivel mechanism 135. Swivel mechanism 135 may include a first end 210 for coupling to hanging rod 125 (e.g., coupling to eyelet 127) and a second end 215 for coupling to blade 145. Swivel mechanism 135 may be implemented as any mechanism for allowing blade 145 to move freely in a plurality of dimensions (e.g., by spinning). In some implementations, the swivel mechanism 135 is a ball bearing swivel (commercially available though Bass Pro Shops as a "Ball Bearing Swivel with Interlock Snap"), although other types of swivel mechanisms may be used as well. Referring to FIG. 2, the swivel mechanism 135 includes an eyelet 210 for coupling to eyelet 127 and a snap mechanism 215 for coupling to blade 145. In some implementations, the snap mechanism 215 may couple to an eyelet 147*a* configured in blade 145. Moreover, when the ball bearing swivel is used, a ball bearing mechanism 217 includes a ball(s) and a race(s) to enable the swivel mechanism to spin freely.

Referring again to FIG. 1, blade 145 may be coupled to swivel mechanism 135 and shaped to move freely in the wind. In some implementations, blade 145 spins freely in response to wind. For example, in some implementations, blade 145 spins about a longitudinal axis 180 in response to winds as low as about 1 miles per hour. Moreover, the spinning of blade 145 about longitudinal axis 180 may enhance the attraction of animals, such as waterfowl, birds, humans, and the like.

Figure 3B:
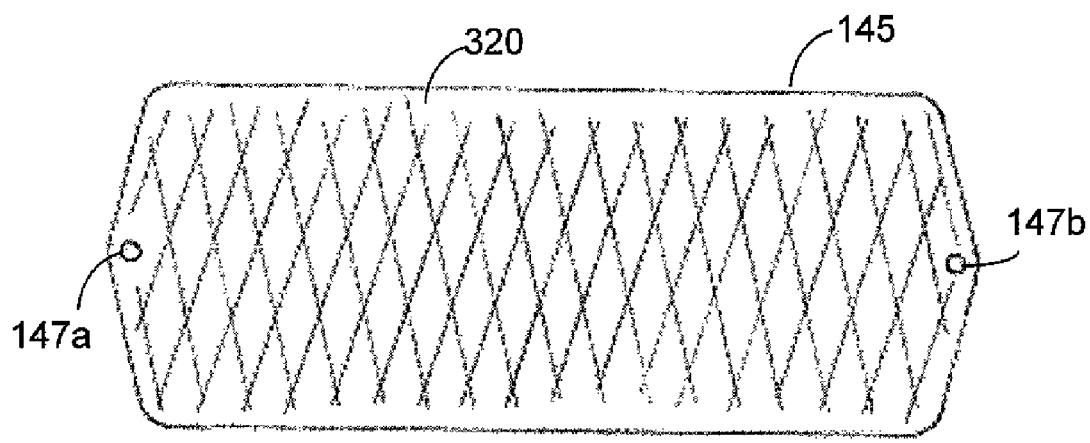
FIGS. 3A and 3B depicts a view of a blade used in the wind driven device of FIG. 1.
Figure 3A:
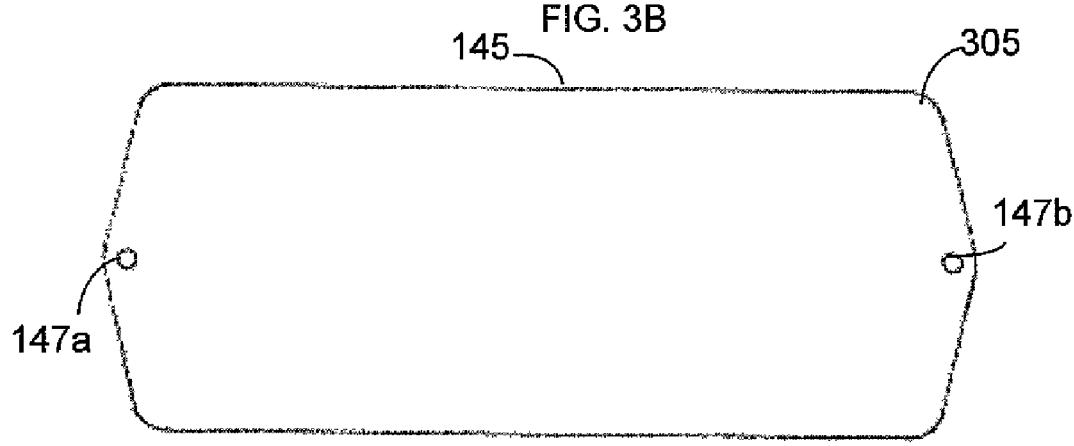

FIG. 3A depicts blade 145. Blade 145 may be made of any material, such as aluminum, plastic, or the like, capable of taking and holding a shape, such as the shape of blade 145 (e.g., as described below with respect to FIGS. 4A and 4B). Moreover, blade 145 may have a width that is 5/12 the length (i.e., the length along longitudinal axis 180). In some implementations, the 5/12 width-to-length ratio of blade 145 may provide enhanced spinning characteristics in response to wind as well as enhanced attraction of animals. The blade 145 may be configured to have contrasting colors on each side. For example, blade 145 may have a first side configured in white 305 and a second side, as depicted in FIG. 3B, configured in black 320 (the cross hatch represents black). When contrasting colors are used, the spinning of the blade about the longitudinal access in response to wind generates a so-called "strobe effect" providing enhanced attraction of animals, such as birds, waterfowl, and the like. Although the previous example describes black and white as contrasting colors, other color schemes may be used as well.

Moreover, blade 145 may have eyelet 147*a* for coupling to swivel mechanism 135. In some implementations, blade 145 may have another eyelet 147*b*. The second eyelet 147*b* enables wind driven device to be configured for a plurality of blades. For example, eyelet 147*b* may be coupled to another swivel mechanism, which is coupled to a second blade. The second blade may be coupled to another hanging rod coupled to another support pole, although in some cases the other rod and other support pole may be omitted.

Figure 4A:
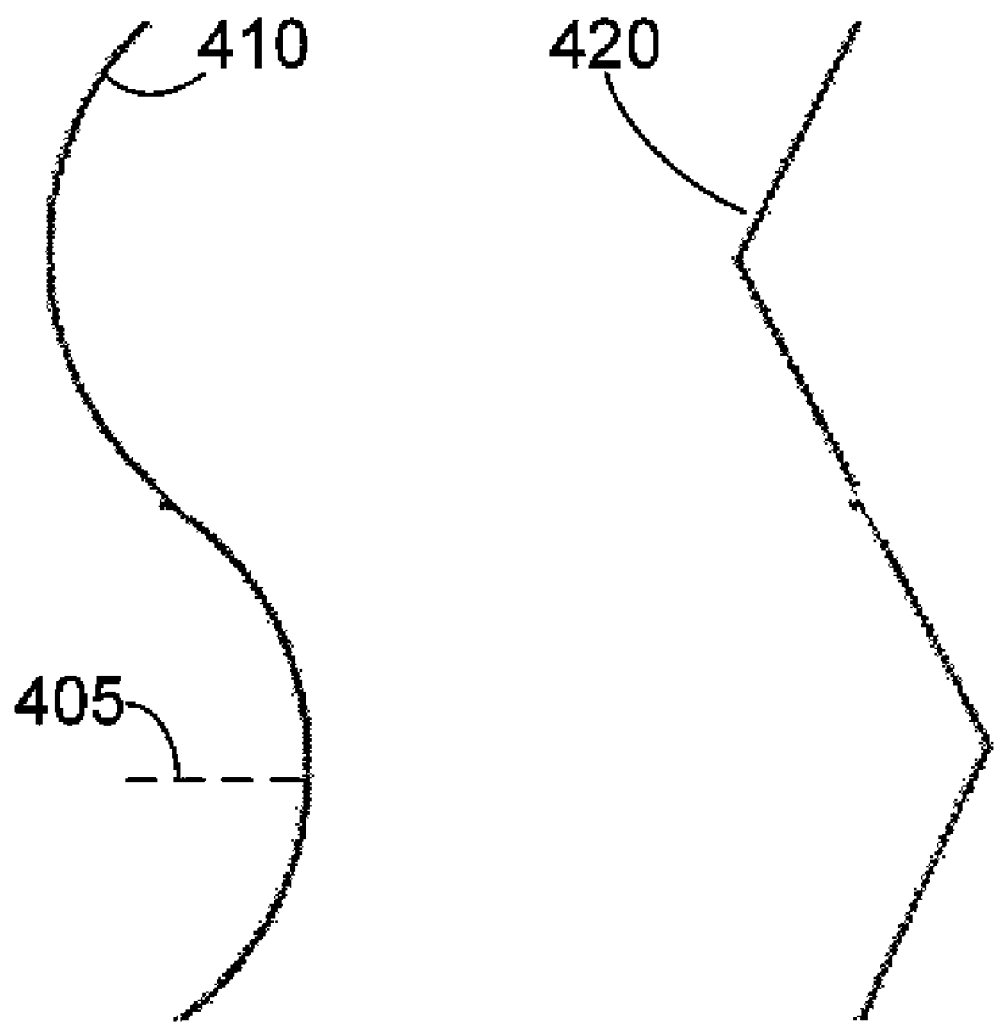
FIG. 4A depicts blade shapes, as viewed along the longitudinal axis of the blade.
Figure 4B:
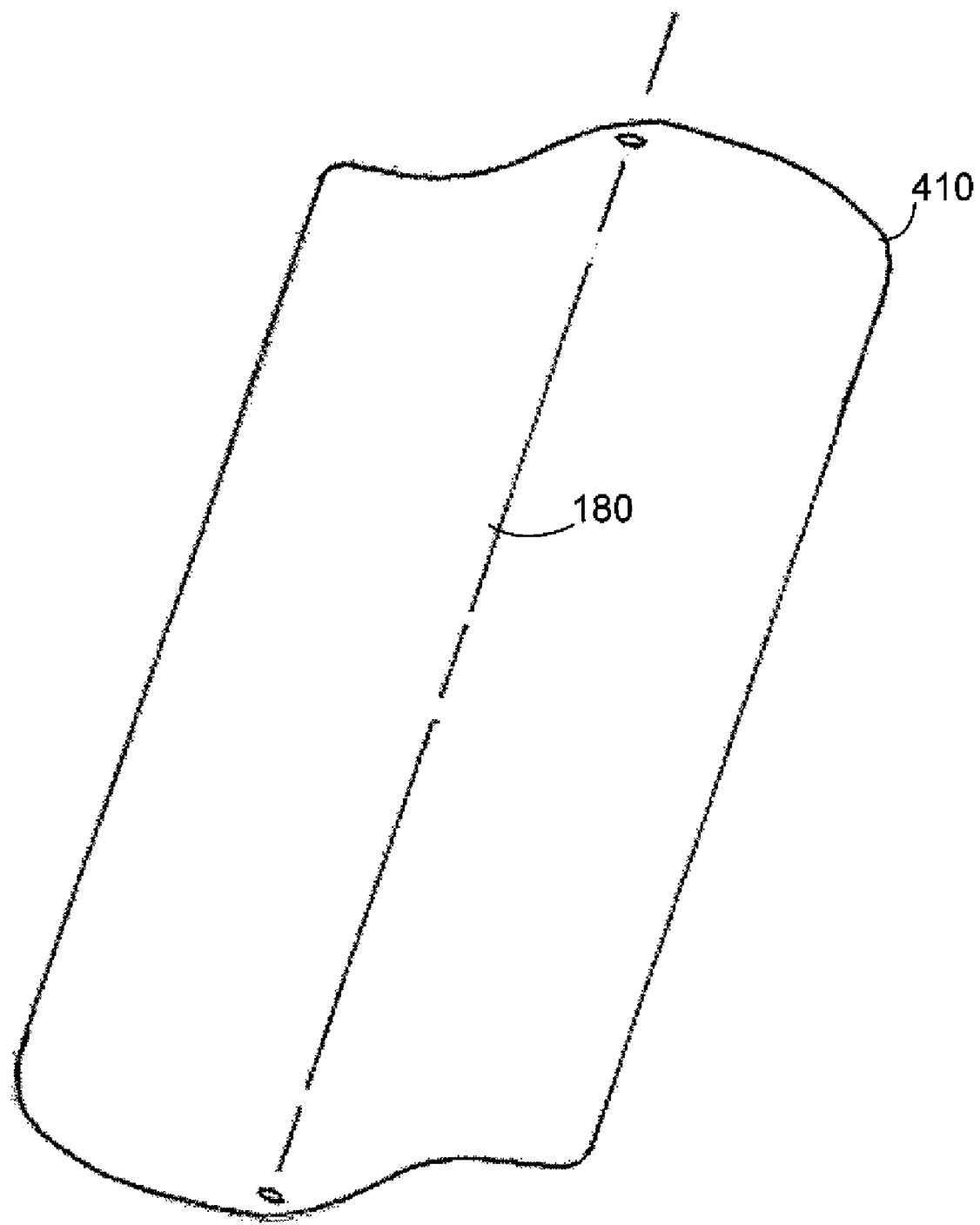
FIG. 4B depicts an oblique view of one of the blade shapes.

Blade 145 may also be shaped to enable movement, such as spinning, in response to wind. FIG. 4*a* depicts various shapes as viewed along longitudinal axis 180. For example, the shape of blade 145 may an s-shape 410 or a z-shape 420, although other shapes may be used as well. In some implementations, s-shape 410 may have an inner radius 405 of three inches to provide enhanced movement in response to wind, although other radii may be used as well. Moreover, when a z-shape 420 is used, the blade may be shaped to have an angle 420 between 120 and 130 degrees, although other angles may be used as well. FIG. 4B depicts an oblique view of the s-shape 410.

Figure 5:
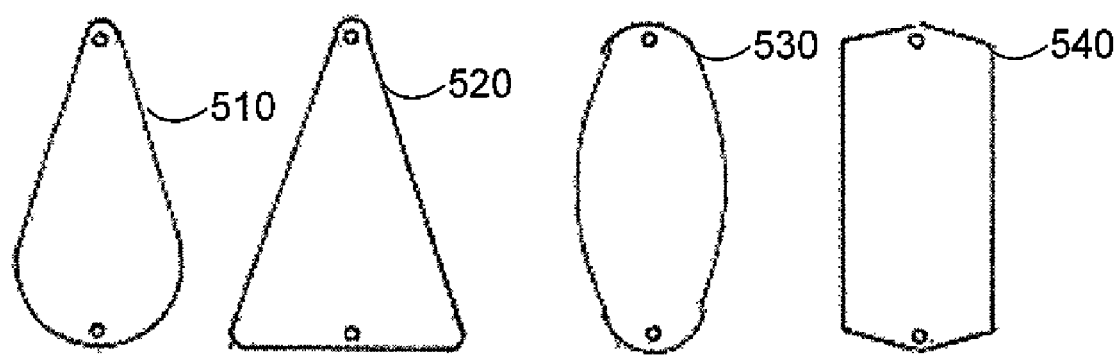
FIG. 5 depicts blade patterns, as viewed perpendicularly to the longitudinal axis of the blade.

Referring again to FIG. 3A, although blade 145 is depicted as a parallelogram, blade 145 may be patterned to have other configurations. FIG. 5 depicts example patterns 510-540 for blade 145. The view perspective of patterns 510-540 is perpendicular to axis 180. Referring to FIG. 5, the pattern may be a teardrop 510, a triangle shape 520, an ellipse 530, a parallelogram 540 (the pattern depicted for blade 145 at FIG. 1), and the like.

Referring again to FIG. 1, blade 145 spins along longitudinal axis 180 in response to wind. The movement (e.g., spinning) attracts animals, such as birds, waterfowl, ducks, humans, and the like, so that they are within range of wind driven device 100 and, in some case, within range of a hunter, a photographer, and the like waiting for the animal. Moreover, when contrasting colors are used on opposing surfaces of blade 145, as described above with respect to FIGS. 3A and 3B, the strobe effect caused by the spinning blade 145 and contrasting colors further attracts animals to within range of wind driven device 100. Wind driven device 100 does not require batteries for movement as wind driven device 100 is powered by wind. Moreover, wind driven device 100 does not resemble (i.e., have the appearance of) an animal, such as a bird, a duck, or the like.

Figure 6:
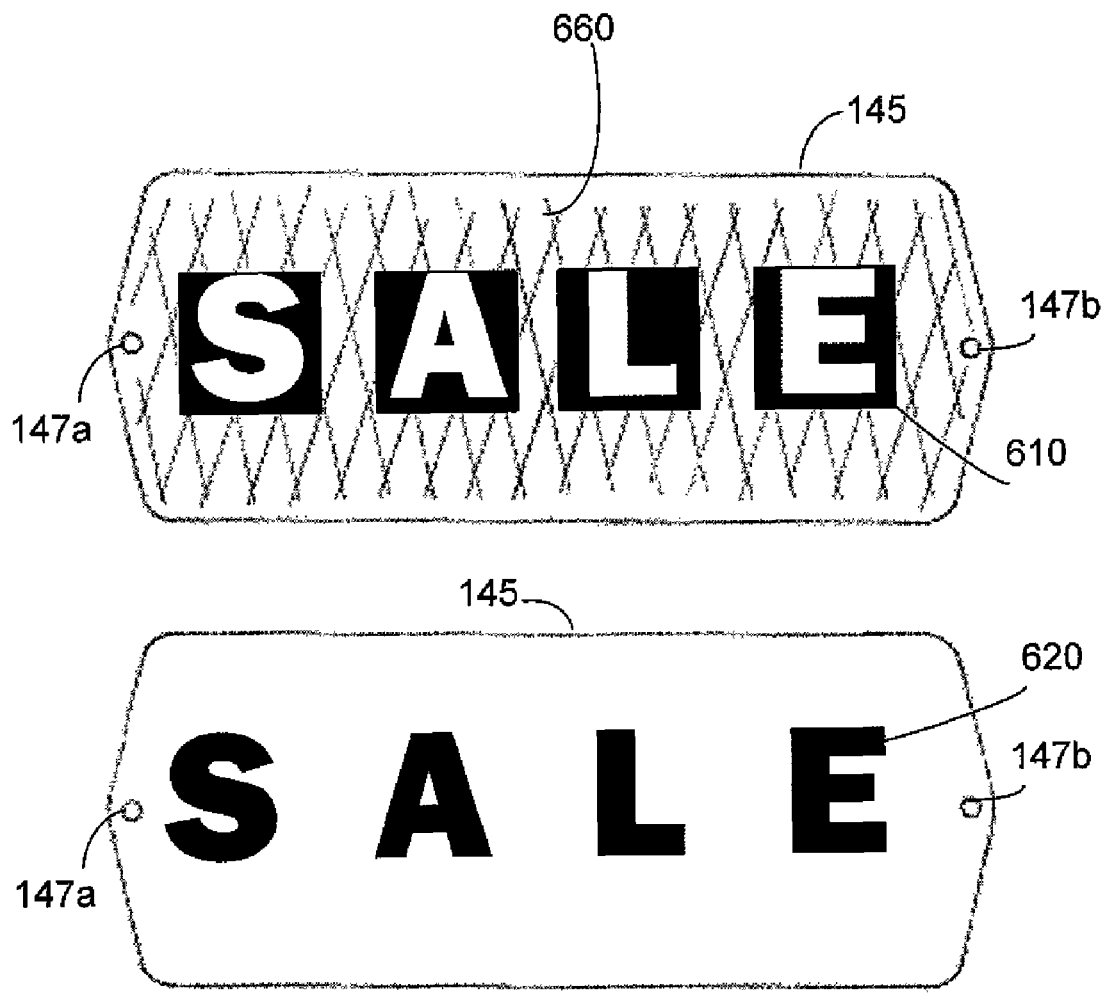
FIG. 6 depicts a blade imprinted with an indication for advertising.

FIG. 6 depicts an implementation of wind driven device 100 for attracting animals, such as humans. Specifically, wind driven device 100 may be used as an advertising mechanism. Referring to FIG. 6, a first side of blade 145 may include an indication 610 on at least one surface of the blade and a second side of blade 145 may include another indication 620. The indications 610 and 620 may be implemented in contrasting colors (e.g., black (also represented by the cross hatch 660) and white), so that when blade 145 moves (e.g., spins) in response to wind, the indications 610 and 620 are visible. Moreover, the spinning creates a so-called "strobe" effect that typically attracts the attention of humans. In the example of FIG. 6, the indication is "SALE," so that when the blade spins a person may be attracted to the device and/or the "SALE." In some implementations, the indication on the first side and second side are registered (i.e., aligned), so that spinning yields a readable indication. Although FIG. 5 depicts the indication as "SALE," any other type of indication may be used as well.

Figure 7:
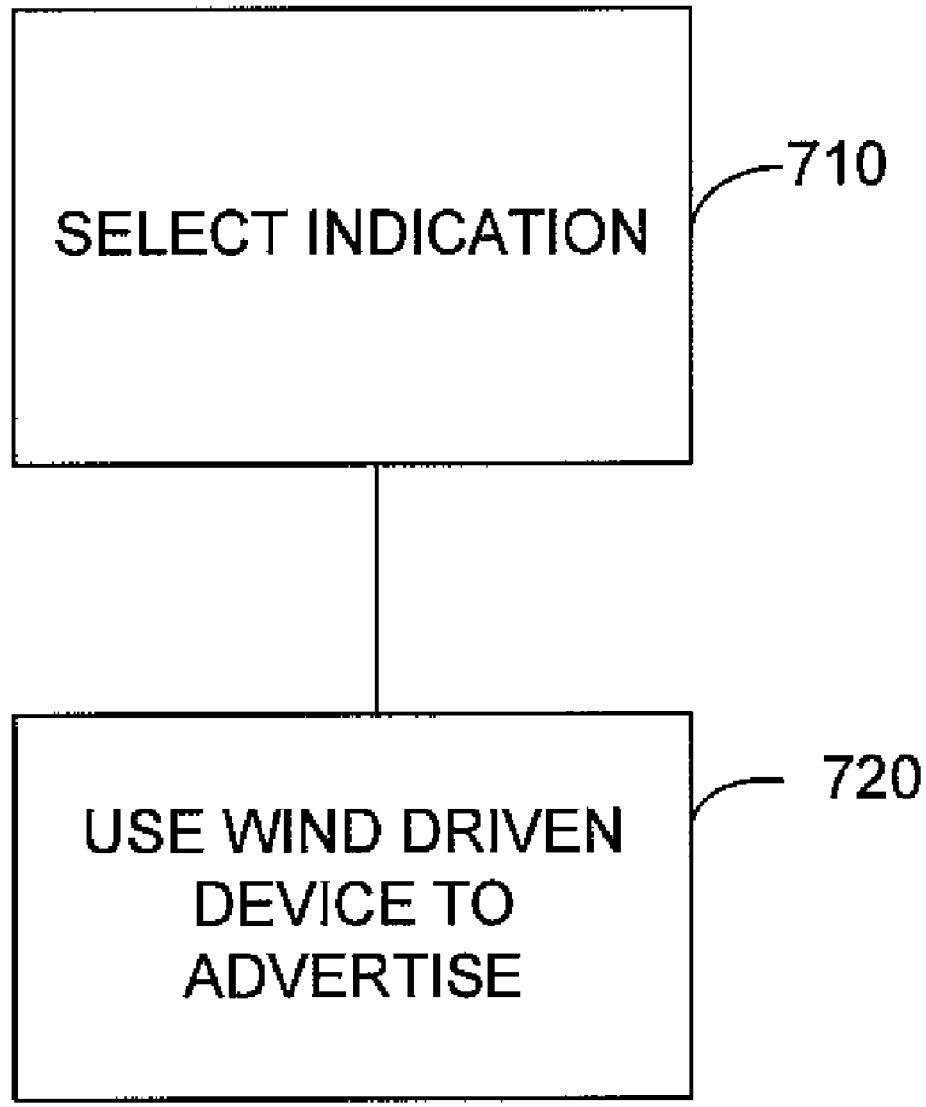
FIG. 7 depicts a process for advertising using the wind driven device.

FIG. 7 depicts a process 700 for advertising. At 710, an indication may be selected to advertise a good or a service. For example, the indication may state "SALE." At 720, the wind driven device 100 is used, so that when the device spins, the indication is visible, and thus serves as a form of advertisement. The strobe effect typically further enhances the effects of attracting the attention of humans and thus increasing the effectiveness of the advertisement. In some implementations, a plurality of preprinted blades may be used. Each of the preprinted blades may have a different indication preprinted on the blade.

FIG. 8A depicts a wind driven device 800A. Wind driven device 800A is similar to wind driven device 100 in many respects. However, wind driven device 800A includes a hanging rod 825 having a so-called "Y-shape." The blade 145 may be coupled to swivel mechanisms 135a, and the swivel mechanisms are each coupled to hanging rod 825. The hanging rod 825 can be coupled to the support pole 105 as described above with respect to FIG. 1. Although FIG. 8A depicts a single blade 145, any number of blades may be used as well.

Figure 8B:
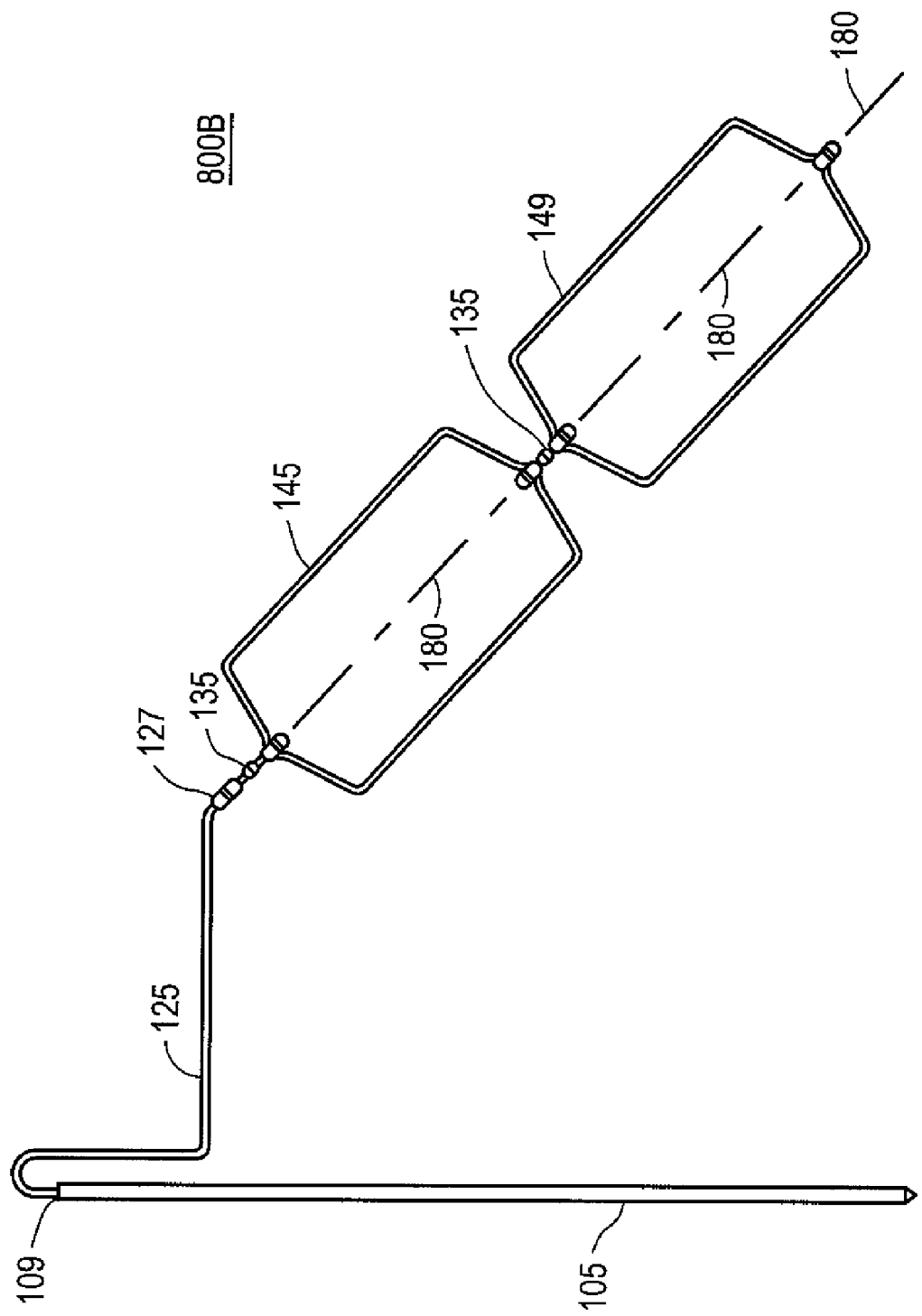

FIG. 8B depicts a wind driven device 800B. Wind driven device 800B is similar in many respects to wind driven device 100, but wind driven device 800B is an example of a multi-blade configuration. For example, the wind driven device 800B may include a first blade 145 and one or more other blades, such as blade 149, coupled to first blade 145. The first blade 145 may be coupled to the other blades using any form of coupling including, for example, a swivel mechanism, such as swivel mechanism 135. The other blade 149 may also be coupled to another swivel mechanism, hanging rod, and support pole.

In some implementations, the swivel mechanism and hanging rod may include a sound deadening material. For example, a plastic sleeve or coating may be applied to portions of the swivel mechanism (see, e.g., FIG. 2 at 210 and 215) and hanging rod to reduce noise. In some implementations, the sound deadening material enhances the attraction of animals, such as birds and other waterfowl.

The foregoing description is intended to illustrate but not to limit the scope of the invention, which is defined by the scope of the appended claims. Other embodiments are within the scope of the following claims.

What is claimed:

1. A decoy comprising:
a single support pole extending along a substantially vertical axis;
a single hanging rod coupled to the single support pole, wherein the single hanging rod further comprises a first end and a distal second end, the first end of the single hanging rod coupled to a swivel mechanism, the second end of the hanging rod fixedly coupled to the single support pole, the first end of the single hanging rod extending horizontally beyond the vertical axis of the single support pole; and
a blade having a first portion and a distal second portion, wherein the first portion is coupled to the swivel mechanism which is coupled to the first end of the single hanging rod, the blade contoured to have a substantially s-shape, the single hanging rod being of a length at least as long as the blade to enable the blade to move freely about a plurality of axes and to spin about a longitudinal axis of the blade without being obstructed by the single support pole, wherein the second distal portion of the blade is not affixed to the single hanging rod to enable the blade to move freely in the plurality of axes to simulate bird flight, the blade further having a first color on a first surface of the blade and a second color on a second surface of the blade, the first and second colors contrasting to attract one or more birds when the blade moves and spins in response to wind,
wherein the s-shape of the blade is a cross section shape which is perpendicular to the longitudinal axis of the blade, wherein the s-shape extends substantially along an entire length of the blade.

2. The decoy of claim 1, wherein the first end of the hanging rod includes an eyelet for coupling to the swivel mechanism.

3. The decoy of claim 2, wherein the blade further comprises: a width that is about 5/12 the length of the blade.

4. The decoy of claim 1, wherein the substantially s-shape comprises a z-shape.

5. The decoy of claim 1, wherein the first and second colors cause a strobe effect for attracting the one or more birds.

6. The decoy of claim 1, wherein the blade moves and spins without being powered by electricity and without the decoy resembling the one or more birds.

7. The decoy of claim 1, wherein the hanging rod extends vertically along the length of the support pole before extending horizontally beyond the support pole.

8. The decoy of claim 1, wherein the first and second colors cause a strobe effect when the blade spins.

9. The decoy of claim 1, wherein the swivel mechanism further comprises: an eyelet and a snap mechanism, the eyelet coupling to another eyelet of the hanging rod, and the snap mechanism coupling the blade to the swivel mechanism.

10. The decoy of claim 1, wherein the swivel mechanism further comprises: a first end of the swivel mechanism and a second end of the swivel mechanism, the first end of the swivel mechanism coupled to the hanging rod and a second end of the swivel mechanism coupled to the blade, the swivel mechanism allowing the blade to move freely.

* * * * *